US008565079B2

United States Patent
Kim et al.

(10) Patent No.: US 8,565,079 B2
(45) Date of Patent: Oct. 22, 2013

(54) HOME APPLIANCE AND HOME APPLIANCE SYSTEM

(75) Inventors: Hyun Sang Kim, Changwon-si (KR);
Eui Hyeok Kwon, Changwon-si (KR);
Hae Yong Kang, Changwon-si (KR);
Yong Tae Kim, Changwon-si (KR);
Koon Seok Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 692 days.

(21) Appl. No.: 12/603,810

(22) Filed: Oct. 22, 2009

(65) Prior Publication Data

US 2010/0259398 A1  Oct. 14, 2010

Related U.S. Application Data

(60) Provisional application No. 61/168,388, filed on Apr. 10, 2009.

(51) Int. Cl.
*H04N 5/44* (2011.01)
*G01R 31/08* (2006.01)
*G08C 19/16* (2006.01)
*G08B 3/00* (2006.01)

(52) U.S. Cl.
USPC ......... 370/230; 340/12.29; 340/635; 348/734

(58) Field of Classification Search
None
See application file for complete search history.

(56) References Cited

U.S. PATENT DOCUMENTS

| | | | |
|---|---|---|---|
| 3,910,322 A | 10/1975 | Hardesty et al. | |
| 4,146,754 A | 3/1979 | Rose | |
| 4,766,505 A * | 8/1988 | Nakano et al. | 386/314 |
| 4,897,659 A | 1/1990 | Mellon | |
| 4,977,394 A | 12/1990 | Manson et al. | |
| 5,103,214 A | 4/1992 | Curran et al. | |
| 5,210,784 A | 5/1993 | Wang et al. | |
| 5,268,666 A | 12/1993 | Michel et al. | |
| 5,452,344 A | 9/1995 | Larson | |
| 5,506,892 A | 4/1996 | Kojima et al. | |
| 5,664,218 A | 9/1997 | Kim et al. | |

(Continued)

FOREIGN PATENT DOCUMENTS

| | | |
|---|---|---|
| CN | 1212304 | 3/1999 |
| CN | 1393672 | 1/2003 |

(Continued)

OTHER PUBLICATIONS

International Search Report dated Dec. 18, 2009.
International Search Report dated Dec. 21, 2009.
International Search Report dated Jan. 4, 2010.
PCT International Search Report dated May 26, 2011 issued in Application No. PCT/KR2010/005108.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).

(Continued)

*Primary Examiner* — George Bugg
*Assistant Examiner* — Renee Dorsey
(74) *Attorney, Agent, or Firm* — KED & Associates LLP

(57) ABSTRACT

A home appliance and home appliance system are provided which enable a portable terminal not to recognize an acoustic signal sound corresponding to product information output by the home appliance as noise. Thus, the acoustic signal corresponding to product information output by the home appliance may be transmitted to a service center through the portable terminal. The home appliance may include a controller that sets a dead time at a predetermined interval of time with respect to a signal corresponding to product information to avoid a noise detection section of a portable terminal, a converter that converts the signal into an acoustic signal of a predetermined band, and a sound output device that outputs the acoustic signal as sound.

20 Claims, 2 Drawing Sheets

(56) References Cited

U.S. PATENT DOCUMENTS

| | | | |
|---|---|---|---|
| 5,757,643 | A | 5/1998 | Kuroda et al. |
| 5,774,529 | A | 6/1998 | Johannsen et al. |
| 5,864,828 | A | 1/1999 | Atkins |
| 5,939,992 | A | 8/1999 | Devries et al. |
| 5,940,915 | A | 8/1999 | Nam ................... 8/159 |
| 5,987,105 | A | 11/1999 | Jenkins et al. |
| 6,121,593 | A | 9/2000 | Mansbery et al. |
| 6,759,954 | B1 | 7/2004 | Myron et al. |
| 6,763,458 | B1 | 7/2004 | Watanabe et al. ............ 713/100 |
| 6,778,868 | B2 | 8/2004 | Imamura et al. |
| 6,870,480 | B2 | 3/2005 | Suzuki et al. |
| 6,906,617 | B1 | 6/2005 | Van der Meulen |
| 7,135,982 | B2 | 11/2006 | Lee ................... 340/635 |
| 7,243,174 | B2 | 7/2007 | Sheahan et al. |
| 7,266,164 | B2 | 9/2007 | Jeon et al. |
| 7,280,643 | B2 | 10/2007 | Howard et al. ............ 379/93.37 |
| 7,337,457 | B2 | 2/2008 | Pack et al. ................... 725/40 |
| 7,363,031 | B1 | 4/2008 | Aisa |
| 7,439,439 | B2 | 10/2008 | Hayes et al. ................... 84/600 |
| 7,509,824 | B2 | 3/2009 | Park et al. ................... 68/12.23 |
| 7,631,063 | B1 | 12/2009 | Ho et al. |
| 7,648,476 | B2 | 1/2010 | Bock et al. |
| 7,653,512 | B2 | 1/2010 | Cheung et al. ................ 702/184 |
| 7,750,227 | B2 | 7/2010 | Hayes et al. |
| 7,843,819 | B1 * | 11/2010 | Benveniste ................... 370/230 |
| 7,965,632 | B2 | 6/2011 | Sugaya |
| 8,027,752 | B2 | 9/2011 | Castaldo et al. |
| 8,040,234 | B2 | 10/2011 | Ebrom et al. ................ 340/531 |
| 8,045,636 | B1 | 10/2011 | Lee et al. |
| 8,132,049 | B2 | 3/2012 | Yasukawa et al. |
| 8,204,189 | B2 | 6/2012 | Rhodes et al. |
| 8,325,054 | B2 | 12/2012 | Kim et al. |
| 8,391,255 | B2 * | 3/2013 | Ribiere et al. ................ 370/338 |
| 8,428,910 | B2 | 4/2013 | Papadimitriou et al. |
| 2002/0032491 | A1 | 3/2002 | Imamura et al. |
| 2002/0078742 | A1 | 6/2002 | Kim ................... 73/162 |
| 2002/0097161 | A1 | 7/2002 | Deeds |
| 2002/0116959 | A1 | 8/2002 | Ohta et al. |
| 2002/0120728 | A1 | 8/2002 | Braatz et al. |
| 2003/0028345 | A1 | 2/2003 | Watkins et al. |
| 2003/0110363 | A1 | 6/2003 | Bachot et al. |
| 2003/0128850 | A1 | 7/2003 | Kimura et al. |
| 2003/0167782 | A1 | 9/2003 | Roh et al. |
| 2003/0196492 | A1 | 10/2003 | Remboski et al. ............. 73/593 |
| 2004/0032853 | A1 | 2/2004 | D'Amico et al. |
| 2004/0132444 | A1 | 7/2004 | Herrmann |
| 2004/0158333 | A1 | 8/2004 | Ha et al. |
| 2004/0211228 | A1 | 10/2004 | Nishio et al. |
| 2004/0249903 | A1 | 12/2004 | Ha et al. |
| 2004/0261468 | A1 | 12/2004 | Lueckenbach |
| 2005/0015890 | A1 | 1/2005 | Kim et al. |
| 2005/0029976 | A1 | 2/2005 | Terry et al. |
| 2005/0086979 | A1 | 4/2005 | Son et al. |
| 2005/0129200 | A1 | 6/2005 | Forrest et al. ............. 379/93.37 |
| 2005/0134472 | A1 | 6/2005 | Jang et al. |
| 2005/0162909 | A1 | 7/2005 | Wooldridge |
| 2006/0048405 | A1 | 3/2006 | Baek et al. |
| 2006/0066758 | A1 * | 3/2006 | Higashihara ................... 348/734 |
| 2006/0089818 | A1 | 4/2006 | Norell et al. |
| 2006/0136544 | A1 | 6/2006 | Atsmon et al. |
| 2006/0168740 | A1 | 8/2006 | Ha et al. |
| 2006/0259199 | A1 | 11/2006 | Gjerde et al. |
| 2007/0113595 | A1 | 5/2007 | Harwood et al. |
| 2007/0137265 | A1 | 6/2007 | Shikamori et al. |
| 2007/0175883 | A1 | 8/2007 | Miu et al. |
| 2007/0189323 | A1 | 8/2007 | Swoboda et al. |
| 2007/0219756 | A1 | 9/2007 | Frankel et al. |
| 2007/0272286 | A1 | 11/2007 | Curtius et al. |
| 2008/0036619 | A1 | 2/2008 | Rhodes et al. |
| 2008/0072383 | A1 | 3/2008 | Bextermoller et al. |
| 2008/0122648 | A1 | 5/2008 | Ebrom et al. |
| 2009/0067102 | A1 | 3/2009 | Cline et al. |
| 2009/0160637 | A1 | 6/2009 | Maeng |
| 2009/0169434 | A1 | 7/2009 | Ogusu |
| 2009/0282308 | A1 | 11/2009 | Gutsche et al. |
| 2009/0323914 | A1 | 12/2009 | Lee et al. |
| 2010/0037401 | A1 | 2/2010 | Bae et al. |
| 2010/0116060 | A1 | 5/2010 | Murayama ................... 73/593 |
| 2011/0200189 | A1 | 8/2011 | True et al. |

FOREIGN PATENT DOCUMENTS

| | | |
|---|---|---|
| EP | 0 038 687 | 10/1981 |
| EP | 0510519 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| JP | 4-358497 A | 12/1992 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2007-267956 | 10/2007 |
| JP | 2008-003562 | 1/2008 |
| KR | 10-1991-0020404 A | 12/1991 |
| KR | 10-1996-0003308 A | 1/1996 |
| KR | 10-1997-0019443 A | 4/1997 |
| KR | 10-0127232 | 10/1997 |
| KR | 10-0127232 B1 | 10/1997 |
| KR | 10-0143209 | 8/1998 |
| KR | 20-1999-0040564 U | 12/1999 |
| KR | 20-0162050 | 12/1999 |
| KR | 10-2000-0018678 | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-0389690 B1 | 6/2003 |
| KR | 10-0406094 B1 | 11/2003 |
| KR | 10-2004-0050767 | 6/2004 |
| KR | 10-2004-0095017 | 11/2004 |
| KR | 10-2005-0062747 A | 6/2005 |
| KR | 10-2005-0097282 A | 10/2005 |
| KR | 10-0564761 B1 | 3/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2010-0112950 | 10/2010 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |

OTHER PUBLICATIONS

European Search Report dated Oct. 14, 2011 issued in Application No. 09 73 8950.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
International Search Report dated Aug. 23, 2010 (Application No. PCT/KR2010/000319).
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.

(56) References Cited

OTHER PUBLICATIONS

United States Office Action dated Feb. 14, 2012 issued in U.S. Appl. No. 12/431,910.
United States Office Action dated Mar. 1, 2012 issued in U.S. Appl. No. 12/846,040.
International Search Report dated Dec. 1, 2010 (PCT/KR2010/002211).
International Search Report dated Dec. 1, 2010 (PCT/KR2010/002222).
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in Application No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
European Search Report dated Jan. 2, 2013.
Ethem M Sözer; "Simulation and Rapid Prototyping Environment for Underwater Acoustic Communications: Reconfigurable Modem"; Oceans-Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/551,827 dated Mar. 11, 2013.
U.S. Office Action issued in U.S. Appl. No. 12/842,649 dated Mar. 22, 2013.
U.S Appl. No. 12/431,893, filed Apr. 29, 2009, Leshui Zhang.
U.S Appl. No. 12/431,903, filed Apr. 29, 200, Leshui Zhang.
U.S Appl. No. 12/431,910, filed Apr. 29, 2009, Leshui Zhang.
U.S Appl. No. 12/432,111, filed Apr. 29, 2009, Leshui Zhang.
U.S Appl. No. 12/432,132, filed Apr. 29, 2009, Leshui Zhang.
U.S Appl. No. 12/551,827, filed Sep. 1, 2009, Leshui Zhang.
U.S Appl. No. 12/757,339, filed Apr. 9, 2010, Vishak Ganesh.
U.S Appl. No. 12/568,022, filed Sep. 28, 2009, Phung Nguyen.
U.S Appl. No. 12/757,205, filed Apr. 9, 2010, Alexander Satanovsky.
U.S Appl. No. 12/757,213, filed Apr. 9, 2010, Philip A. Guyton.
U.S Appl. No. 12/757,232, filed Apr. 9, 2010, Mohamed Charioui.
U.S Appl. No. 12/757,246, filed Apr. 9, 2010, Vishak Ganesh.
U.S Appl. No. 12/432,184, filed Apr. 29, 2009, Minh Chau Nguyen.
U.S Appl. No. 13/382,334, filed Jan. 5, 2012, Scott T. Baderman.
U.S Appl. No. 13/808,414, filed Jan. 4, 2013.
U.S Appl. No. 13/808,403, filed Jan. 4, 2013.
U.S Appl. No. 12/842,649, filed Jul. 23, 2010, Xiuqin Sun.
U.S Appl. No. 12/842,679, filed Jul. 23, 2010, Tai T. Nguyen.
U.S Appl. No. 12/846,013, filed Jul. 29, 2010, Shirley Lu.
U.S Appl. No. 12/846,040, filed Jul. 29, 2010, Mark A. Fleischer.
U.S Appl. No. 12/847,272, filed Jul. 30, 2010, Manuel L. Barbee.
U.S Appl. No. 12/847,303, filed Jul. 30, 2010, Kerri L. McNally.
U.S Appl. No. 12/847,406, filed Jul. 30, 2010, Manuel L. Barbee.
U.S Appl. No. 12/847,284, filed Jul. 30, 2010 Manuel L. Barbee.
U.S Appl. No. 12/847,306, filed Jul. 30, 2010, Manuel L. Barbee.
U.S Appl. No. 12/852,240, filed Aug. 4, 2010, Omer S. Khan.
U.S Appl. No. 13/522,066, filed Jul. 13, 2012.
U.S Appl. No. 13/562,704, filed Jul. 31, 2012.
U.S Appl. No. 13/588,164, filed Aug. 17, 2012.
U.S. Office Action issued in U.S. Appl. No. 12/757,232 dated Apr. 18, 2013.
U.S. Office Action issued in U.S. Appl. No. 12/846,013 dated May 7, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
U.S. Office Action issued in U.S. Appl. No. 12/757,339 dated Sep. 6, 2013.

* cited by examiner

HOME APPLIANCE AND HOME APPLIANCE SYSTEM

This application claims priority to U.S. Provisional Application No. 61/168,388, filed Apr. 10, 2009, which is hereby incorporated by reference.

BACKGROUND

1. Field

A home appliance and home appliance system are disclosed herein.

2. Background

Home appliances and home appliance systems are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described in detail with reference to the accompanying drawings.

Embodiments disclosed herein relate to a home appliance and a home appliance system. Embodiments of a home appliance and home appliance system will be described with reference to a laundry treatment machine and a laundry treatment machine system as examples. However, embodiments are not limited to a laundry treatment machine and a laundry treatment machine system, but rather, may be employed as other home appliances and home appliance systems. Such home appliances may include, for example, a TV, an air conditioner, a washing machine, a refrigerator, an electric rice cooker, or a microwave or conventional oven.

During an operation, a home appliance may store set values for the operation, information generated during the operation, and failure information. In the event of a failure, the home appliance may output a predetermined alarm to enable a user to recognize the state of the appliance. Such a home appliance may output detailed failure information through an output device, such as a display, lamp, etc., as well as operation completion information or information indicating an occurrence of failure.

In the event of a failure of the home appliance, the user may contact a service center to ask advice on the current state of the home appliance, or request the service center to dispatch a repairman to the home, thus receiving after-sale service. In such a case, failure information may be output from the home appliance, for example, as a code that the user cannot understand, and thus, it is difficult for the user to cope with the failure. Moreover, even though the user may be connected to the service center, the user may not notify the service center of the exact state of the home appliance. Therefore, in the case where a repairman visits the user's house, it may take a lot of time and cost to repair the corresponding home appliance, since the repairman does not know in advance of the visit the exact state of the home appliance. For example, in the case where, the repairman does not have parts necessary to repair the home appliance, the repairman must revisit the house, which requires further time and effort.

To solve this problem, a home appliance may be connected to a server of the service center via a predetermined communication device; however, it is necessary to set up a dedicated communication network.

Figure 1:
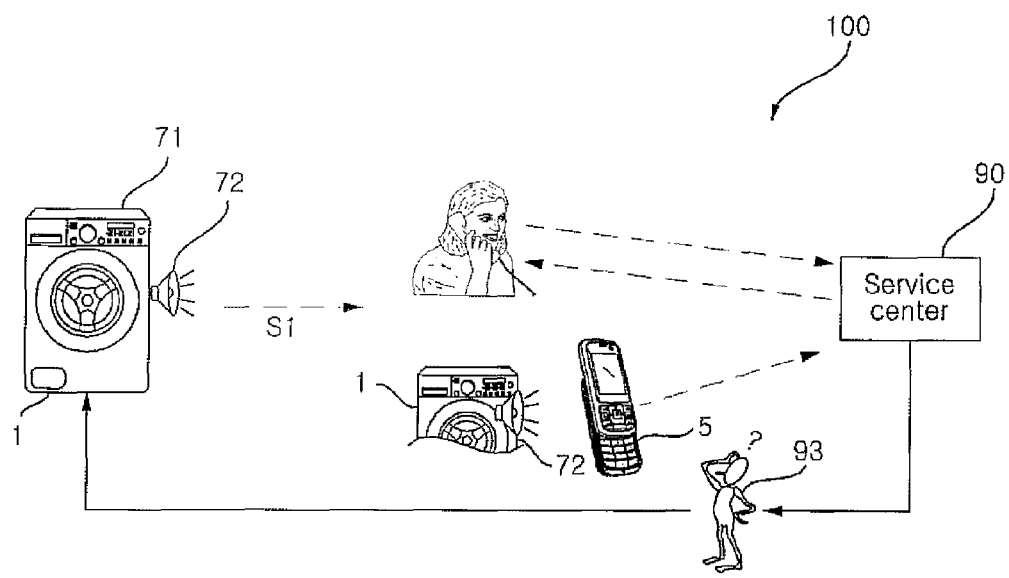
FIG. 1 is a conceptual diagram showing a home appliance and home appliance system in accordance with an embodiment, illustrating how the home appliance is connected to a service center.

FIG. 1 is a conceptual diagram showing a home appliance and home appliance system in accordance with an embodiment, illustrating how the home appliance is connected to a service center. Referring to FIG. 1, a home appliance system 100 including a home appliance 1 is shown. The home appliance 1 may include an output device 70 that outputs product information, which may include status and/or failure information. The output device 70 may include a display 71 and a sound output device 72.

The display 71 may be a light emitting device, such as, for example, a light emitting diode (LED), a liquid crystal display (LCD), or an organic light emitting diode (OLED), which may visually display product information, such as status information and/or failure information of the home appliance 1. The sound output device 72 may audibly output a sound corresponding to the product information, such as status information and/or failure information.

When the home appliance 1 is, for example, out of order during an operation, the home appliance 1 may notify a user of the occurrence of the failure through the display device 71 or the sound output device 72. Then, the user may notify a service center 90 of the occurrence of the failure and request the service center 90 to provide a diagnosis. At this time, the user may notify the service center 90 of product information, including, for example, a model number and failure conditions of the home appliance 1, in the form of an acoustic signal output by the home appliance 1 using a portable terminal 5, thus providing the product information of the home appliance to the service center 90. Then, the service center 90 may provide necessary and appropriate after-sale service to the user.

The home appliance 1 may generate an acoustic signal corresponding to the product information, which may include status information and/or failure information, of the home appliance 1, the portable terminal 5 may provide the acoustic signal generated by the home appliance 1 to the service center 90, and the service center 90 may analyze the acoustic signal to take appropriate measures to remedy the failure of the home appliance 1 corresponding to the product information that the user provides.

The acoustic signal output from the home appliance 1 to the portable terminal 5 may be controlled at a predetermined interval of time. That is, the acoustic signal output from the home appliance 1 may be recognized as noise by the portable terminal 5 unlike a voice signal. When an acoustic signal with constant magnitude and frequency is continuously applied, the portable terminal 5 may recognize the acoustic signal as noise and perform a noise cancellation.

Figure 2:
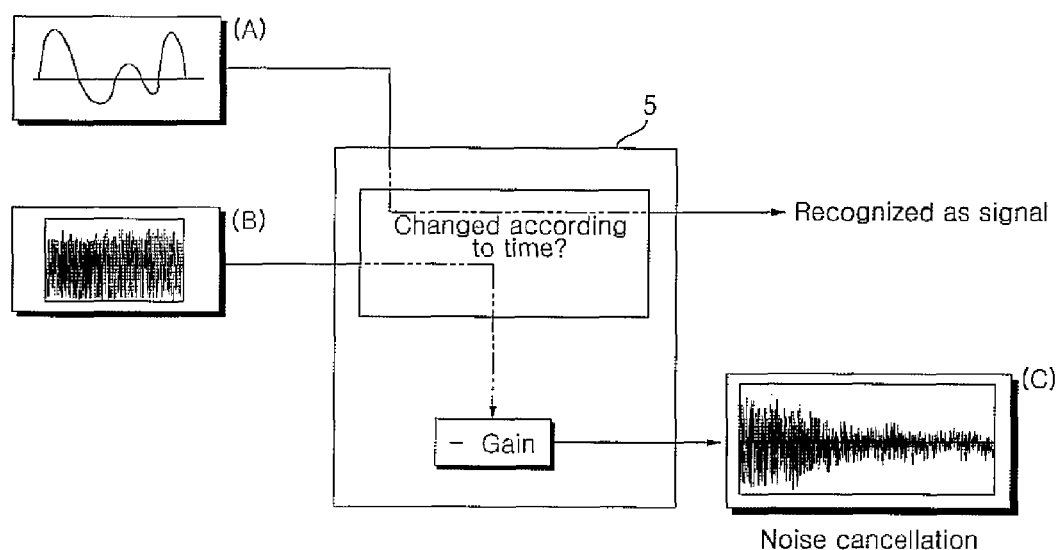
FIG. 2 is a conceptual diagram illustrating noise cancellation of a portable terminal.

The noise cancellation of the portable terminal will be described hereinbelow with reference to FIG. 2. FIG. 2 is a conceptual diagram illustrating noise cancellation of a portable terminal.

Referring to FIG. 2, the portable terminal 5 may recognize a signal A with a change as data among signals in an audio frequency band, and may recognize a signal B with a constant pattern, even after a time lapse, as noise. The portable terminal 5 may produce a waveform C by reducing the gain of signal B recognized as noise. Therefore, beep sounds and mechanical sounds for representing error codes, which are generated from the home appliance 1, may be recognized as noise by the portable terminal 5.

According to embodiments disclosed herein, when an acoustic signal corresponding to product information is generated by the home appliance 1 and transmitted to the service center 90 through the portable terminal 5, the acoustic signal may be converted into an intermittent signal such that the acoustic signal corresponding to the product information may not be recognized as noise. The acoustic sound converted into the intermittent signal may not be recognized as noise by the portable terminal 5, but rather, may be recognized as an ordinary voice signal, and thus be provided to the service center 90.

The user may establish a call connection with the service center 90 using the portable terminal 5 to provide the product information to the service center 90 through a consultant or an automatic response system (ARS). During the connection with the service center 90, the user may bring the portable terminal 5 adjacent to the home appliance 1 such that the portable terminal 5 may provide the acoustic signal corresponding to the product information to the service center 90.

The service center 90 may analyze the acoustic signal received through the portable terminal 5 and determine the product information, which may include failure conditions, of the home appliance 1. The service center 90 may determine necessary parts needed to repair the home appliance 1 or the kind of service needed based on the analyzed results, and may dispatch a repairman 93 to a site where the home appliance 1 is located, thus providing quick and accurate after-sale service.

Figure 3:
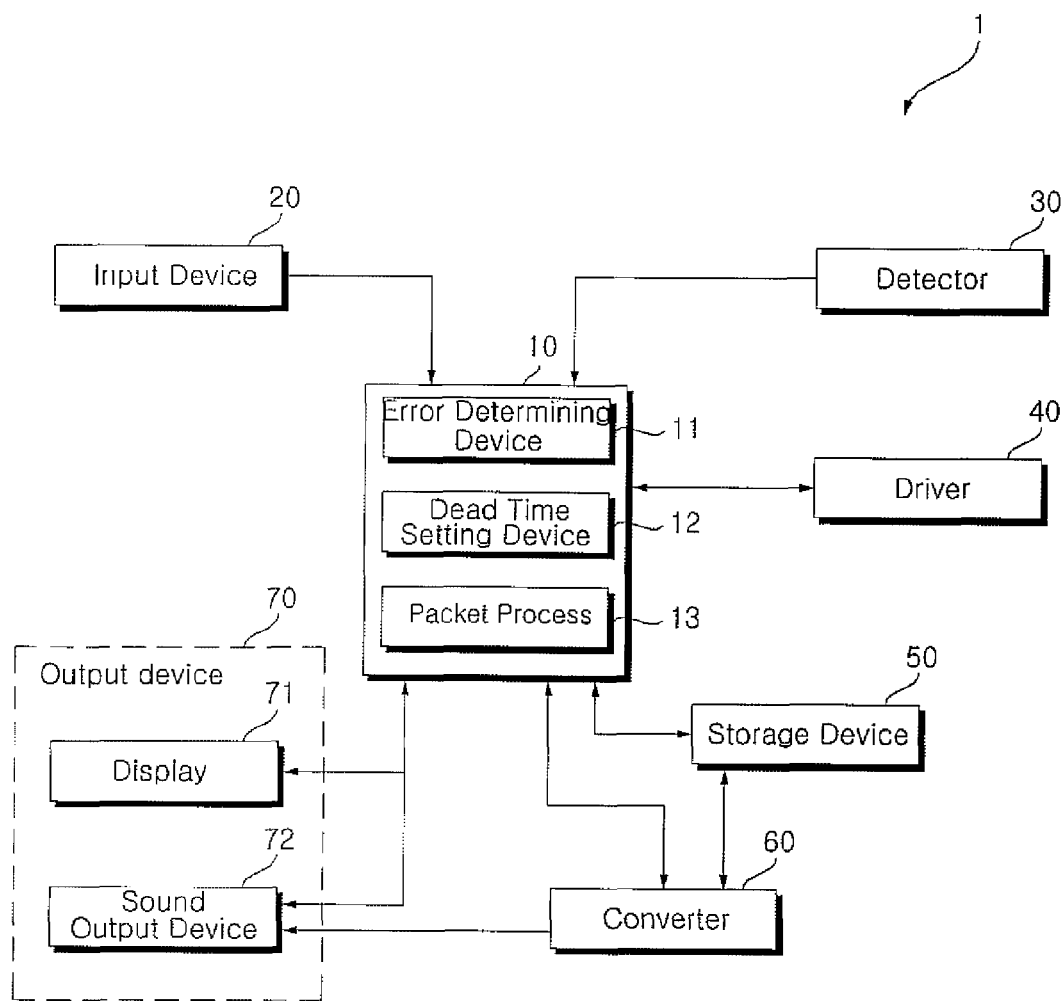
FIG. 3 is a block diagram of a home appliance in accordance with an embodiment.

FIG. 3 is a block diagram of a home appliance in accordance with an embodiment. Referring to FIG. 3, the home appliance 1 may include an input device 20, a detector 30, a driver 40, a storage device 50, a converter 60, an output device 70, and a microcontroller or a controller 10 that controls an overall operation of the home appliance 1. The output device 70 may include a display 71 and a sound output device 72.

The operation of the driver 40 may be controlled in response to a control signal applied from the controller 10, such that the home appliance 1 performs an operation corresponding to the control signal. For example, in the case of a laundry treatment device, the driver 40 may, for example, drive a motor to rotate a washing tub or drum, such that the washing tub or drum rotates to remove dirt from laundry. Moreover, the driver 40 may control a valve in response to a control signal to supply or drain water.

The detector 30 may include at least one sensor to measure data for an operational status of the home appliance 1, and may apply the measured data to the controller 10 while the home appliance 1 performs an operation specified by the driver 40. For example, in the case of a laundry treatment device, the detector 30 may, for example, measure a level of water during water supply or during water drainage and measure a temperature of the supplied water and a rotational speed of the washing tub or drum.

The storage device 50 may store, for example, operational status data generated during operation of the home appliance 1, operational information such as set-up data input by the input device 20, and failure information including a cause of the failure and a failure area during failure of the home appliance 1. Moreover, the storage device 50 may store control data for controlling the operation of the home appliance 1, and reference data used during the operation control.

The input device 20 may include at least one input mechanism to allow a user to input a control signal such that the home appliance 1 performs a function that a user wants. In the case where the home appliance 1 is a laundry treatment device, the input device 20 may include, for example, a set of keys (or buttons) that allow a user to set, for example, a temperature of water to be supplied to the laundry, an amount of water, a rotation method of the drum, a rotation time of the drum, and whether the laundry is to be dried.

Results input through the input device 20 may be applied to the controller 10, and the controller 10 may drive the home appliance 1 with reference to conditions established through the input device 20. The input device 20 may be configured, for example, as a button, a dome switch, a touch pad (resistive/capacitive), a jog wheel, a jog switch, a finger mouse, a rotary switch, a jog dial, or any device capable of generating predetermined input data by operation of a user.

The controller 10 may control the overall operation of the home appliance 10 based on a set-up value that the user sets through the input device 20. In the event of a failure during operation of the home appliance 1, the controller 10 may process product information, which may include failure information, of the corresponding home appliance 1 and provide the processed packet data to the converter 60. The controller 10 may generate the packet data with respect to the product information so as not to be recognized as noise by the portable terminal 5.

The controller 10 may include an error determining device 11, a dead time setting device 12, and a packet processor 13. The error determining device 11 may detect an error of the home appliance 1 through the detector 30 or may determine an uncontrollable part among parts constituting the home appliance 1. After determining the type of error generated in the home appliance 1, the error determining device 11 may select an error code corresponding to the type of error and may provide the error code to the dead time setting device 12.

When converting the error code into an acoustic signal, the dead time setting device 12 may repeat a signal section of the error code and an inter-frame space (IFS), such that the acoustic signal is not recognized as noise by the portable terminal 5. When detecting an acoustic signal having a same frequency for more than approximately 2.5 to 3 seconds, most portable terminals may determine such an acoustic signal as noise, and when detecting an acoustic signal having the same frequency for more than a maximum of approximately 10 seconds, they may determine the acoustic signal as noise. The dead time setting device 12 may set a signal section of the error code within approximately 2.5 to 3 seconds, such that the acoustic signal with respect to the error code may not be recognized as noise by the portable terminal 5, and the signal section may not exceed a maximum of approximately 10 seconds.

Figure 4:
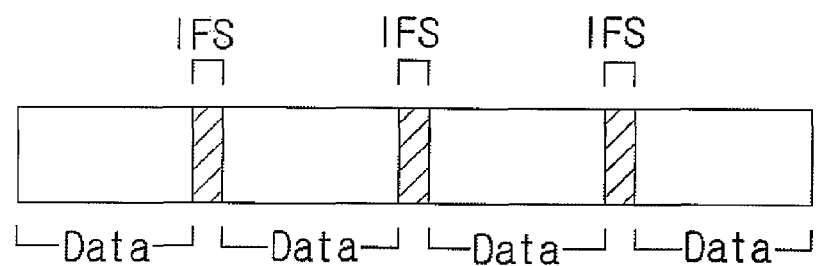
FIG. 4 is a conceptual diagram showing a structure of signal sections and inter-frame spaces (IFSs) according to an embodiment.

The IFS may be repeatedly inserted into a middle of the acoustic signal with respect to the error code. The IFS and the signal section will be described in detail with respect to FIG. 4 below FIG. 4 is a conceptual diagram showing a structure of signal sections and inter-frame spaces (IFSs). Referring to FIG. 4, the dead time setting device 12 may divide the acoustic signal with respect to the error code into signal sections (Data) and the IFS, in which the IFS is repeated at a predetermined interval of time.

When the IFS is repeated at a predetermined interval of time, the acoustic signal may be reproduced in the form of an intermittent sound. Since the intermittent sound may not be recognized as noise by the portable terminal 5, it may be possible to provide the acoustic signal corresponding to the product information to the service center 90 through the portable terminal 5. The acoustic signal generated by the dead time setting device 12 may not be a signal in the audio frequency band, but may correspond to a signal to be converted into a signal in the audio frequency band by the converter 60, which will be described later, and then reproduced by the sound output device 72.

When the size of the IFS is smaller, an amount of signal capable of being transmitted per unit time (for example, approximately 1 second) may be increased; however, the signal may be recognized as noise by the portable terminal 5. In contrast, when a size of the IFS is larger, the signal may not be recognized as noise by the portable terminal 5; however, the amount of signal capable of being transmitted per unit time (for example, approximately 1 second) may be reduced. Therefore, the IFS may have a value between approximately 0.1 to 1 second.

The packet processor 13 may convert the acoustic sound having the IFSs set by the dead time setting device 12 into a packet form. The packet processor 13 may convert the acoustic signal corresponding to the product information into a combination of a signal and a cycle redundancy code (CRC). The CRC may be used to correct an error of the received acoustic signal by the service center 90.

The converter 60 may convert the acoustic signal provided by the controller 10 into an analog signal in a predetermined frequency band. The converter 60 may convert the acoustic signal by, for example, frequency shift keying, amplitude shift keying, or phase shift keying. The converter 60 may stop the signal conversion during the IFS in which a dead time is set up.

The sound output device 72 may be turned on and off by a control signal of the controller 10 and may output a predetermined signal sound by receiving an acoustic signal output from the converter 60. Here, the sound output device 72 may be a means for outputting a sound, such as, for example, a speaker, buzzer, or similar device.

When the output operation is completed after the sound output device 72 outputs a reproduced sound with respect to the acoustic sound, the operation of the sound output device 72 may be stopped and, when a signal output command is input by the input device 20, the sound output device 72 may be operated again to output a predetermined signal sound.

The display 71 may display information input by the input device 20, such as, operation status information of the home appliance 1 and/or information on operation completion of the home appliance 1, in response to a control signal of the controller 10. Further, the display 71 may display failure information in the event of a failure of the home appliance 1. In this case, the output device 70 may further include a lighting or flickering lamp or vibration element in addition to the sound output device 72 and the display 71; however, a detailed description thereof has been omitted.

As set forth above, the data or acoustic signal output by the sound output device 72 as sound may be made up of a series of packets. It is noted that each packet is configured to be analyzed individually and therefore is designed to contain all the information required for its extraction; no information is used from other packets to reproduce the original packets from the analog signal.

The packets are compiled by the controller 10 in digital form and then converted to an analog signal by the converter 60 to be output as sound by the sound output device 72.

For example, the packet according one embodiment may include 82 fields of data (different types of data) and approximately 1000 symbols. Transmission of the entire packet may take approximately 12 to approximately 13 seconds. The dead time setting device 12 may divide the data frames into several groups of data frames each having a transmission time of under approximately 3 seconds and may insert an IFS between each group of data frames. For example, the groups of data frames may each include, for example, approximately 250 symbols and may have a transmission time of approximately 3 seconds. The IFS may contain, for example, approximately 16 symbols and may have a transmission time of approximately 192 ms. The IFSs force the portable terminal 5 to treat the packet as data and not noise.

As described above, the home appliance in accordance with embodiments disclosed herein enable a portable terminal not to recognize a product information signal sound as noise, and thus, the product information signal sound may be transmitted to a service center through the portable terminal.

One object of the embodiments disclosed herein is to provide a home appliance which can provide product information, such as status and/or failure information, to a service center through a portable terminal.

The home appliance and home appliance system according to embodiments disclosed herein convert product information, which may include appliance operation information and/or failure information, into an acoustic signal and add a dead time to the acoustic signal, such that a portable terminal may not recognize the acoustic signal as noise, thus facilitating inspection and after-sale service of the corresponding household appliance.

A home appliance according to embodiments disclosed herein may include a controller that sets a dead time at a predetermined interval of time with respect to a signal corresponding to product information to avoid a noise detection section of a portable terminal, a converter that converts the signal into an acoustic signal of a predetermined band, and a sound output device that outputs the acoustic signal as sound.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance, comprising:
    a controller that outputs a digital signal corresponding to product information, the digital signal comprising a plurality of frames, each of the plurality of frames being separated by a predetermined time interval;
    a converter that receives the digital signal from the controller and converts the digital signal into a modulated acoustic signal; and a sound output device that receives the modulated acoustic signal from the converter and outputs from the home appliance the modulated acoustic signal as a predetermined sound, wherein the predetermined time interval comprises an inter-frame space (IFS), wherein when the IFS is repeated at a predetermined interval of time, the acoustic signal is reproduced in the form of an intermittent sound, and wherein the converter stops the signal conversion during the IFS.

2. The home appliance of claim 1, wherein each of the plurality of frames has a transmission time of approximately 1 to approximately 10 seconds.

3. The home appliance of claim 1, wherein the predetermined time interval has a transmission time of approximately 0.1 to approximately 1 second.

4. The home appliance of claim 1, wherein the converter converts the digital signal into the modulated acoustic signal by frequency shift keying, amplitude shift keying, or phase shift keying.

5. The home appliance of claim 1, wherein the product information includes status information.

6. The home appliance of claim 1, wherein the product information includes failure information.

7. The home appliance of claim 1, wherein the digital signal corresponding to the product information is in packet form.

8. The home appliance of claim 7, wherein a total transmission time of the packet is approximately 12 to approximately 13 seconds.

9. The home appliance of claim 8, wherein the packet comprises approximately 1000 symbols.

10. The home appliance of claim 9, wherein each of the plurality of frames contains approximately 250 symbols.

11. The home appliance of claim 9, wherein each of the plurality of frames has a transmission time of approximately 3 seconds.

12. The home appliance of claim 9, wherein the inter-frame space (IFS) contains approximately 16 symbols.

13. The home appliance of claim 9, wherein the inter-frame space (IFS) has a transmission time of approximately 192 ms.

14. A home appliance system comprising the home appliance of claim 1.

15. A home appliance, comprising:
  a controller that outputs a digital signal corresponding to product information in packet form, the packet comprising a plurality of frames, each of the plurality of frames being separated by an inter-frame space (IFS);
  a converter that receives the digital signal from the controller and converts the digital signal into a modulated acoustic signal; and
  a sound output device that receives the modulated acoustic signal from the converter and outputs from the home appliance the modulated acoustic signal as a predetermined sound, wherein when the IFS is repeated at a predetermined interval of time, the acoustic signal is reproduced in the form of an intermittent sound, and wherein the converter stops the signal conversion during the IFS.

16. The home appliance of claim 15, wherein each of the plurality of frames has a transmission time of approximately 1 to approximately 10 seconds.

17. The home appliance of claim 15, wherein the IFS has a transmission time of approximately 0.1 to approximately 1 second.

18. The home appliance of claim 15, wherein a total transmission time of the packet is approximately 12 to approximately 13 seconds.

19. The home appliance of claim 18, wherein the packet comprises approximately 1000 symbols.

20. A home appliance system comprising the home appliance of claim 15.

* * * * *